(12) United States Patent
Jin et al.

(10) Patent No.: US 8,698,871 B2
(45) Date of Patent: Apr. 15, 2014

(54) 3G MULTIMEDIA DISPATCHING COMMAND SYSTEM

(75) Inventors: Jianyun Jin, Linfen (CN); Yong Li, Linfen (CN); Yunfeng Zhao, Linfen (CN); Weimin Zheng, Linfen (CN); Zhonghua Xi, Linfen (CN); Gang Lu, Linfen (CN); Lihu Guo, Linfen (CN); Jinping Sun, Linfen (CN)

(73) Assignees: Shanxilinfen Power Supply Company, Linfen (CN); State Grid Corporation of China, Beijing (CN)

( * ) Notice: Subject to any disclaimer, the term of this patent is extended or adjusted under 35 U.S.C. 154(b) by 238 days.

(21) Appl. No.: 13/299,216

(22) Filed: Nov. 17, 2011

(65) Prior Publication Data

US 2012/0120180 A1    May 17, 2012

(30) Foreign Application Priority Data

Nov. 17, 2010   (CN) ...................... 2010 2 0614582 U

(51) Int. Cl.
    *H04N 7/14*        (2006.01)
(52) U.S. Cl.
    USPC ..................................... 348/14.02

(58) Field of Classification Search
    USPC ........ 348/14.02, 14.01, 14.08, 14.09; 379/45, 379/37; 455/404.1
    See application file for complete search history.

(56) References Cited

U.S. PATENT DOCUMENTS

| | | | |
|---|---|---|---|
| 2002/0118796 A1* | 8/2002 | Menard et al. | 379/45 |
| 2004/0246127 A1* | 12/2004 | Junqua | 340/539.13 |
| 2005/0085257 A1* | 4/2005 | Laird et al. | 455/404.1 |

* cited by examiner

*Primary Examiner* — Stella Woo
(74) *Attorney, Agent, or Firm* — Schwabe, Williamson & Wyatt, P.C.

(57) ABSTRACT

The utility model relates to a 3G multimedia dispatching command system, which belongs to the field of dispatching command system, comprising: a 3G public network, a dispatching platform, an access exchanger, a core exchanger, a core access gateway, a management terminal, a multimedia terminal device, an IP telephone server, and a duplex intercom server, through which a stable structure is constructed to implement a thousand-user simultaneous duplex cluster intercom without space or distance limitation, the conversation is clear without any noise, like the quality of a telephone call. The utility model also has functions of video transmission, personnel location, dispatching sound recording and mobile meeting. The communication is free of charge, the work and communication may be performed simultaneously to ensure the security, and the system can be applied in a wide range.

3 Claims, 2 Drawing Sheets

3G MULTIMEDIA DISPATCHING COMMAND SYSTEM

RELATED APPLICATIONS

This application claims the benefit of and priority to Chinese Patent Application Number 201020614582.X, filed Nov. 17, 2010.

FIELD OF THE INVENTION

The present utility model relates to a dispatching command system, and particularly, to a 3G multimedia dispatching command system.

BACKGROUND OF THE INVENTION

Presently, during the rescue processes of various accidents and natural disasters, in order to improve the rescue efficiency, a comprehensive coordinating command system shall be provided as well as adding manpower and materials. The current dispatching command system transmits information mainly using communication tools such as cell phones, which are usually influenced by many factors such as weather, geographical position and high cost and only unilaterally reflect the voice information. Thus the commander can only acquire the site conditions through hearing to make a decision and an analysis. As a result, the instruction issued by the commander is often lacks accuracy, timeliness and security. Therefore, it is emergently needed to develop a dispatching command system used in rescuing for achieving simple operation, a long conversation time, a high tone quality and a free call charge, and based on a simple visual long distance radio communication device.

The mobile communication technique develops always rapidly since it occurs, and has come through three generations till now. The first generation (1G) mobile communication system originates from 1980's, and it mainly uses the simulation technique and the Frequency Division Multiple Access (FDMA) technique. Due to the limitation of the transmission bandwidth, the fatal defect is that a long-distance roaming of the mobile communication cannot be carried out. The second generation (2G) mobile communication system originates from 1990's, and it mainly uses the digital Time Division Multiple Access (TDMA) and Code Division Multiple Access (CDMA) techniques. This system realizes voice and data services by means of data transmission. The third generation (3G) mobile communication system develops more quickly, and substantially achieves the technical capability aims of "global unified standard, unified band and global seamless roaming", "high spectral efficiency" and "mobile multimedia service". The commercialized WCDMA achieves 384 kbps, CDMA 2000 1X achieves an average user rate of 50 kbps to 97 kbps, and 1XEV/DO achieves an average user rate of 500 kbps. Currently the rate realized by GPRS is 30 kbps to 40 kbps. The experimental system of TD-SCDMA reaches a rate of 148 kbps. It can provide various broadband information services that cannot be provided by the 1G and 2G products, such as high rate data, slow rate image, TV image, etc.

The radio signal four-wire duplex transmission technique completely separates the transmission and reception from each other, like making a phone call, and it is more convenient than the half-duplex interphone. The data transmission and reception are separately performed through two different transmission lines. The two communication parties can perform the transmission and reception at the same time, and the transfer mode is full duplex. Under the full duplex mode, each end of the communication system is provided with a transmitter and a receiver, thereby the transfer of data in two directions can be controlled simultaneously. The full duplex mode needs not to switch the direction, thus there is no time delay caused by the switching operation, which is very beneficial to interactive applications not allowing time delay (e.g., remote monitor and control system). This mode requires each communication party to have a transmitter and a receiver, and needs two channels for transferring data signals, i.e., a four-wire transmission.

The digital communication technique has a strong anti-interference capability. The information of the digital communication is contained in the existence of the pulse, and so long as the noise absolute value does not exceed a certain threshold value, the receiving end can determine whether a pulse is existed, to ensure the communication reliability. In addition, the digital communication technique can ensure the quality of a long distance transmission, because a regenerative relaying is adopted in the digital communication and noises can be eliminated. The regenerated digital signal is the same as the original digital signal and can be continued to be transmitted, thus the communication quality is not influenced by the distance, and a long distance communication of high quality can be carried out. Moreover, the digital communication technique also has advantages such as being suitable to various communication service requirements (e.g., telephone, telegram, image, data, etc.), as well as being convenient to realize a unified Integrated Service Digital Network (ISDN), to use a large-scale integrated circuit, to perform an encryption processing and to achieve the computer management of the communication network.

The ultrahigh sensitive signal receiving technique of −100 dBm can solve the bottleneck problem that a transmission distance of an ordinary Bluetooth communication is only a dozen of meters, decrease the acceptable threshold below −100 dBm, and realize the remote transmission of the sound narrow band. The so called threshold effect is a phenomenon that the output Signal-To-Noise Ratio (SNR) of an envelope detector is rapidly deteriorated after the input SNR of the detector is decreased to a specific value. The input SNR at which the threshold effect occurs is called as a threshold value. The threshold effect is caused by the nonlinear demodulation of the envelope detector. In case of a small SNR, the modulation signal cannot be separated from the noise, and the useful signal is submerged in the noise. At that time, the output SNR of the detector is rapidly deteriorated rather than being decreased with the input SNR in proportion, that is to say, a threshold effect occurs.

The work principle of the Frequency-Hopping Spread Spectrum (FHSS) technique is a communication mode where the carrier frequency for signal transmission between the receiving and transmitting parties is changed discretely in a predetermined rule, i.e., the carrier frequency used in the communication randomly hops under the control of the pseudo-randomly variable code. Among the implementation ways of the communication technique, "frequency hopping" is a communication mode that performs multi-frequency frequency-shift keying using a code sequence, and it is also a communication system with carrier frequency hopping under a code control. Viewed from the time domain, the frequency-hopping signal is a multi-frequency frequency-shift keying signal; and viewed from the frequency domain, the spectrum of the frequency-hopping signal randomly hops in an irregular interval within a very wide band. In which, a frequency-hopping controller is the core component, with the functions of frequency-hopping pattern generation, synchronization, adaptive control, etc.; a frequency synthesizer synthesizes the required frequency under the control of the frequency-hopping controller; and a data terminal performs a data error control. As compared with the frequency-fixed communication, the frequency-hopping communication is concealed and difficult to be captured, thus it has a strong anti-interference capability. Even if some frequency points are interfered, a normal communication still can be carried out at other frequency points not interfered. Since the frequency-hopping communication system is an instantaneous narrow band system, it is easy to be compatible with other narrow band communication systems, i.e., the frequency-hopping radio station can be exchanged with conventional narrow band radio stations, which is beneficial to the device update. Frequency-hopping is one of the most common ways for spectrum spreading, and it is also widely used in many fields such as GSM, wireless local area network, indoor wireless communication, satellite communication, underwater communication, radar and microwave.

The 2.4 GHz wireless technique is a short distance wireless transmission technique, with the advantages of high bandwidth (2 Mbps), bidirectional transmission, strong anti-interference capability, far transmission distance (within the range of the short distance wireless technique) and low power consumption. It is well known that 900M is the band of the public network, thus signals can be transmitted by means of the public base station. 1.8G band is the public network dual-frequency backup band, and 2.4G band is the ISM band commonly used in the world, thus they can be used free of charge without applying for a license.

In the data communication system or computer network system, the bandwidth or capacity of the transmission medium usually exceeds the requirement of a single signal transmission. In order to effectively utilize the communication lines, it is hoped that multiple signals are simultaneously transmitted in one channel, which is the so called multiplexing technique. With the multiplexing technique, the signals can be combined and transmitted in one physical channel, so as to greatly save the cable mounting and maintaining fees during the long distance transmission.

SUMMARY OF THE INVENTION

The technical problem to be solved by the utility model is to provide a 3G multimedia dispatching command system to overcome the following defects of the conventional dispatching command system: the information exchange is not in time, the allocation is not in real time, the communication effect is poor and the cost is high, and the actual situation at side cannot be reflected directly.

In order to solve the above problem, the technical solution of the utility model is a 3G multimedia dispatching command system for remote dispatching command, comprising: a 3G public network; a dispatching platform comprising telephones and computers loaded with a dispatching program, the dispatching platform being connected to a core exchanger through an access exchanger, the dispatching platform being configured to enable an operator to collect and analyze information and issue a decision; the access exchanger connected to the dispatching platform, a two-way intercom server and an IP telephone server, for a data exchange between the core exchanger and each of the dispatching platform, the two-way intercom server and the IP telephone server; the core exchanger connected to the access exchanger, for forwarding communication data stream at a high rate, and providing a two-way data exchange, a data synchronization and a backbone transmission structure; a core access gateway connected to the access exchanger, for providing duplex high rate data communication interfaces, and implementing a seamless data link from the 3G public network to the dispatching command system; a management terminal, which is a computer loaded with a management program and connected to the access exchanger, the management program has the highest authority of the dispatching command system to coordinate and manage all levels of authorities of the dispatching command system; a multimedia terminal device for receiving and transmitting voice and video information; an IP telephone server connected to the access exchanger, for managing and allocating telephone IPs to implement a multi-user simultaneous conversation; and a duplex intercom server connected to the access exchanger, for processing received data and transmitted data to implement a wireless signal four-wire duplex transmission.

Further, the multimedia terminal device comprising: a terminal having a microphone, a headset, a camera and a display; a development board for directly providing interfaces for the terminal, wherein the interfaces for the microphone and the headset are audio input and output interfaces, respectively, the interface for the camera is a USB interface, and the interface for the display is a flat cable; and a transceiver for transmitting and receiving various original data processed by a processor. Meanwhile, the multimedia terminal device can be mounted on a safety helmet.

The beneficial effects of the utility model are as follows: the 3G multimedia dispatching command system can be used to implement a thousand-user simultaneous duplex cluster intercom without space or distance limitation, the conversation is clear without any noise, like the quality of a telephone call. The utility model also has functions of video transmission, personnel location, dispatching sound recording and mobile meeting. The communication is free of charge, the work and communication may be performed simultaneously to ensure the security, and the system can be applied in a wide range.

DETAILED DESCRIPTION OF THE PREFERRED EMBODIMENT

Figure 1:
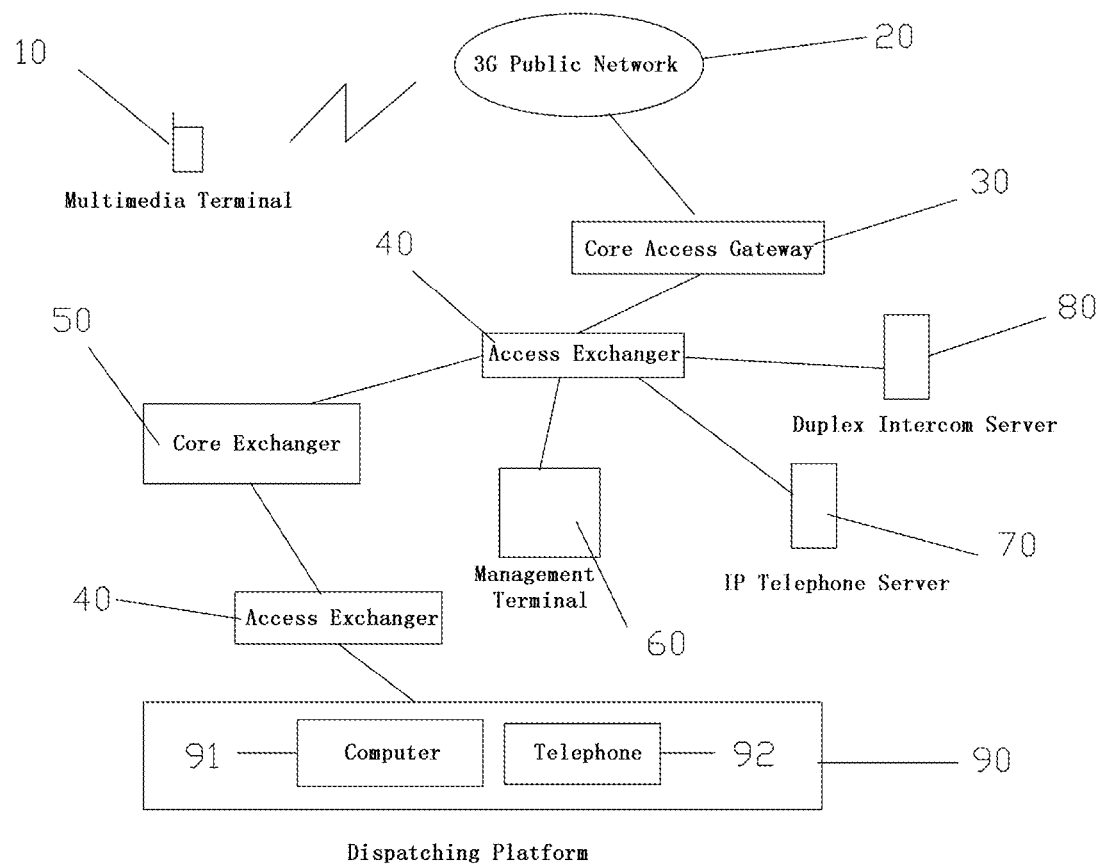
FIG. 1 is a structural diagram of a 3G multimedia dispatching command system according to the utility model.

A 3G multimedia dispatching command system, as illustrated in FIG. 1, including at least one multimedia terminal device 10; a 3G public network 20 is used for wireless signal propagation, and a seamless data link from the 3G public network to the dispatching command system is implemented through a core access gateway 30; a command center is provided with a dispatching platform 90, a duplex intercom server 80, an IP telephone server 70 and a management terminal 60, each of which can be connected to a core exchanger 50 through an access exchanger 40. The core exchanger can forward the communication data stream at a high rate, and provide a two-way data exchange and a data synchronization, so as to form a reliable backbone transmission structure.

The duplex intercom server adopts the wireless signal four-wire duplex transmission processing technique.

The dispatching platform is composed of several computers 91 and telephones 92, through which the staff at command center can issue instructions and analyze information.

The management terminal is a computer loaded with a management program, which can coordinate the works of the whole command system, and provide various functions such as authority setting, group call, broadcast, etc.

The access exchanger adopts an exchanger device that can provide a plurality of ports with the adaptive ability of 10M/100M/1000M.

The core access gateway is a multimedia access exchange device based on the IP voice and data/fax services of the 3G data protocol.

Figure 2:
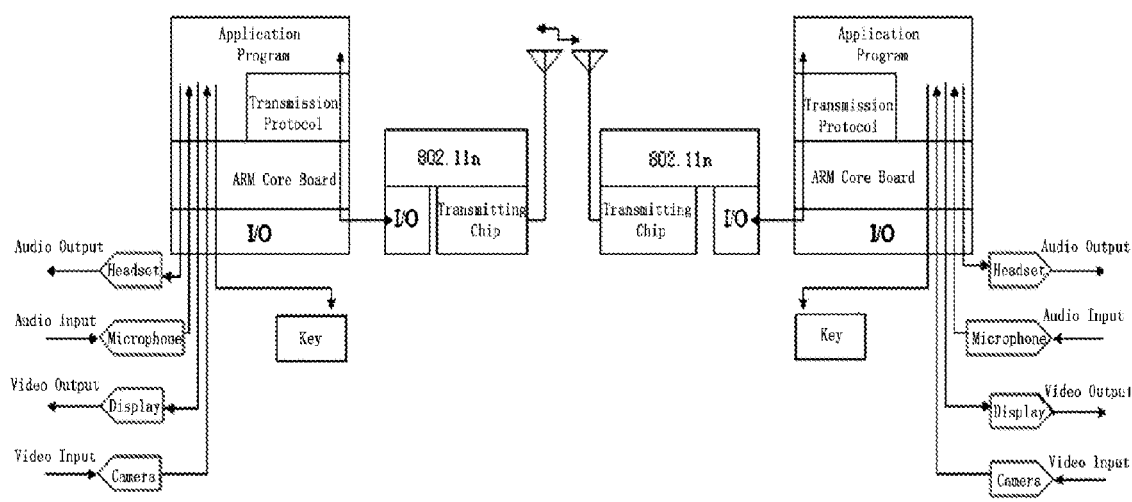
FIG. 2 is a structural diagram of a multimedia terminal.

As illustrated in FIG. 2, the multimedia terminal device is composed of a terminal, a development board and a transceiver. The terminal includes a microphone, a headset, a camera and a display. The development board directly provides interfaces for the terminal, wherein the interfaces for the microphone and the headset are audio input and output interfaces, respectively, the interface for the camera is a USB interface, and the interfaces for the display is a flat cable. Various original data is transmitted and received by the transceiver after being processed by a processor. The multimedia terminal device uses a digital communication technique, an ultrahigh sensitive signal receiving technique of −100 dBm and a frequency hopping technique, thereby ensuring a stable and clear conversation. Meanwhile, the multimedia terminal device can be mounted on a safety helmet, so as to realize a function of simultaneously working and communicating, and then enhance the working security.

What is claimed is:

1. A system, comprising:
a dispatching platform comprising telephones and computers loaded with a dispatching program, the dispatching platform being connected to a core exchanger through a first access exchanger, and the dispatching platform being configured to enable an operator to collect and analyze information and issue a decision;
the first access exchanger connected to the dispatching platform, for a data exchange between the core exchange and the dispatching platform;
a second access exchanger connected to a duplex intercom server and an IP telephone server, for a data exchange between the core exchange and each of the duplex intercom server and the IP telephone server;
the core exchanger connected to the first access exchanger and the second access exchanger, for forwarding communication data stream at a high rate, and providing a two-way data exchange, a data synchronization and a backbone transmission structure;
a core access gateway connected to the second access exchanger, for providing duplex high rate data communication interfaces, and implementing a data link from a communication network to the dispatching command system;
a management terminal, loaded with a management program and connected to the second access exchanger, the management program configured to coordinate and manage authorities of the dispatching command system;
a multimedia terminal device for receiving and transmitting voice and video information;
the IP telephone server connected to the second access exchanger, for managing and allocating telephone IPs to implement a multi-user simultaneous conversation; and
the duplex intercom server connected to the second access exchanger, for processing received data and transmitted data to implement separated transmission and reception of data.

2. The system according to claim 1, wherein the multimedia terminal device comprises a terminal having a microphone, a headset, a camera and a display; a development board for directly providing interfaces for the terminal, wherein the interfaces for the microphone and the headset are audio input and output interfaces, respectively, the interface for the camera is a USB interface, and the interfaces for the display is a flat cable; and a transceiver for transmitting and receiving various original data processed by a processor.

3. The system according to claim 2, wherein the multimedia terminal device can be mounted on a safety helmet.

* * * * *